United States Patent
Suma et al.

(10) Patent No.: US 11,434,870 B2
(45) Date of Patent: Sep. 6, 2022

(54) ELECTRIC POWER SYSTEM FOR CONVERTING WIND ENERGY INTO ELECTRIC ENERGY AND BUILDING WITH SYSTEM

(71) Applicant: IBIS Power Holding B.V., Eindhoven (NL)

(72) Inventors: Alexander Boudewijn Suma, Eindhoven (NL); Diana Kiss, Veldhoven (NL); Ramavtar Tyagi, Eindhoven (NL); Balkrishna Patankar, Eindhoven (NL); Ioana Ramona Cecalasan, Eindhoven (NL)

(73) Assignee: IBIS Power Holding B.V., Eindhoven (NL)

( * ) Notice: Subject to any disclaimer, the term of this patent is extended or adjusted under 35 U.S.C. 154(b) by 719 days.

(21) Appl. No.: 16/305,247

(22) PCT Filed: Jun. 1, 2017

(86) PCT No.: PCT/NL2017/050359
§ 371 (c)(1),
(2) Date: Nov. 28, 2018

(87) PCT Pub. No.: WO2018/012964
PCT Pub. Date: Jan. 18, 2018

(65) Prior Publication Data
US 2020/0325872 A1    Oct. 15, 2020

(30) Foreign Application Priority Data

Jun. 2, 2016 (NL) ...................................... 2016888

(51) Int. Cl.
*F03D 3/04*     (2006.01)
*H02S 10/12*    (2014.01)
(Continued)

(52) U.S. Cl.
CPC ............... *F03D 3/04* (2013.01); *F03D 9/007* (2013.01); *F03D 9/34* (2016.05); *H02S 10/12* (2014.12); *H02S 40/425* (2014.12)

(58) Field of Classification Search
CPC ... F03D 3/04; F03D 9/34; F03D 9/007; H02S 10/12; H02S 40/425
See application file for complete search history.

(56) References Cited

U.S. PATENT DOCUMENTS 3,302,552 A    2/1967  Walsh
3,994,621 A   11/1976  Bogie
(Continued)

FOREIGN PATENT DOCUMENTS

CA    2633876 A1   12/2009
DE   19828324 A1   12/1999
(Continued)

OTHER PUBLICATIONS

International Search Report and Written Opinion dated Nov. 3, 2017, for corresponding International Application No. PCT/NL2017/050359; International Filing Date: Jun. 1, 2017 consisting of 8-pages.

(Continued)

*Primary Examiner* — Sean Gugger
(74) *Attorney, Agent, or Firm* — Christopher & Weisberg, P.A.

(57) ABSTRACT

The present invention relates to an electric power system for converting wind energy into electric energy, comprising a duct for air, the duct comprising a floor, a first and a second wall, a roof, defining an air inflow direction towards, a turbine having a diameter, and being located adjacent to or at least partially in the duct; and defining together with the duct an air outflow direction wherein an area free of pressure and/or turbulence increasing obstructing elements, extend- (Continued)

Figure 1A:
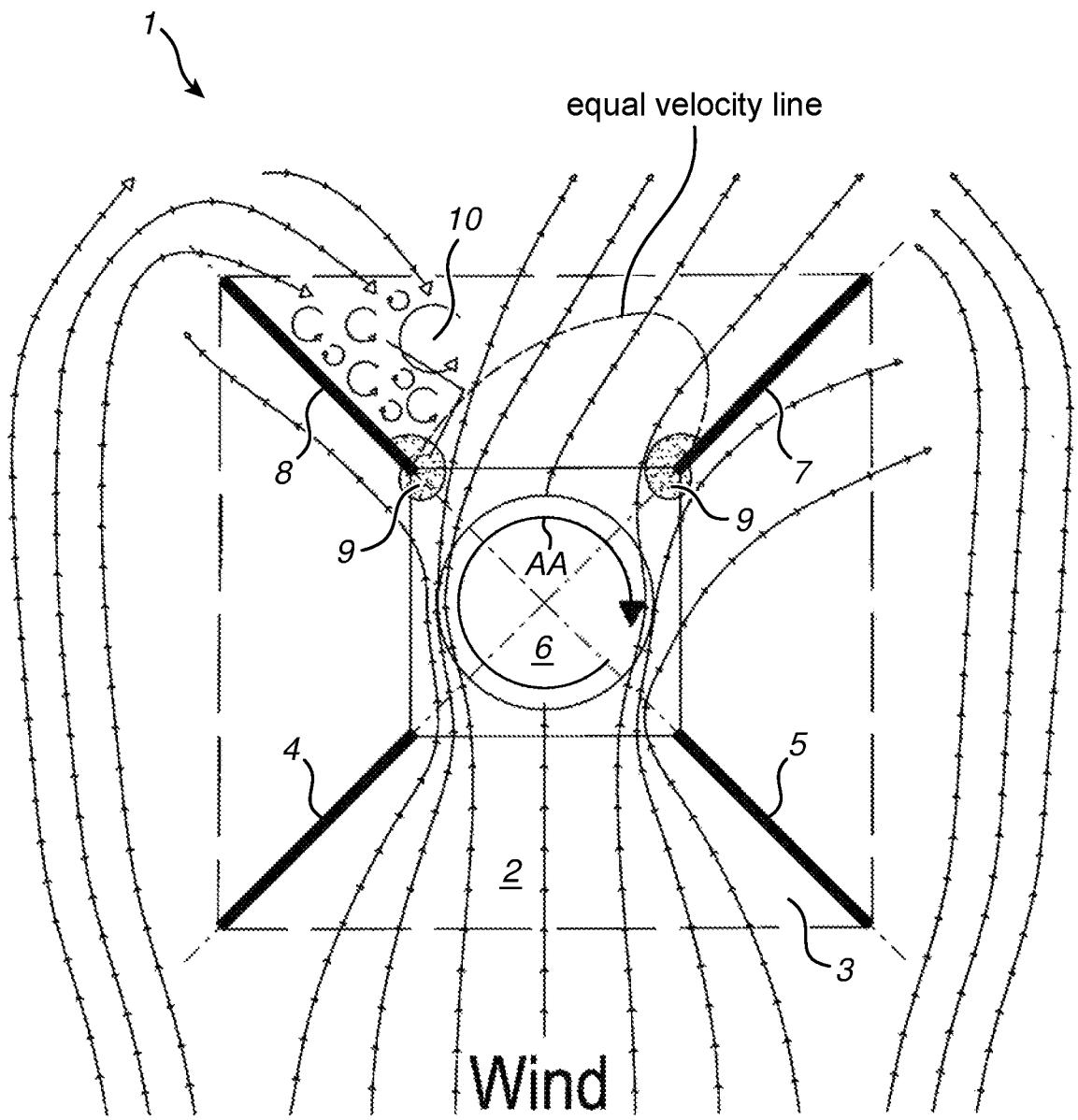

ing in the resultant air outflow direction of the turbine over a length of at least one, and preferably more than two times the turbine diameter, measured from the centre of rotation of the turbine. The invention further relates to a building comprising such system.

19 Claims, 12 Drawing Sheets

(51) Int. Cl.
*H02S 40/42* (2014.01)
*F03D 9/34* (2016.01)
*F03D 9/00* (2016.01)

(56) References Cited

U.S. PATENT DOCUMENTS

| | | | |
|---|---|---|---|
| 4,017,205 A | 4/1977 | Bolie | |
| 4,057,270 A | 11/1977 | Lebost | |
| 4,191,505 A * | 3/1980 | Kaufman | F03D 9/25 415/2.1 |
| 4,237,384 A | 12/1980 | Kennon | |
| 4,269,563 A | 5/1981 | Sharak et al. | |
| 4,396,843 A | 8/1983 | Martinez Parra | |
| 4,415,814 A | 11/1983 | Martinez | |
| 4,433,544 A | 2/1984 | Wells et al. | |
| 4,945,693 A | 8/1990 | Cooley | |
| 5,381,048 A | 1/1995 | Baird | |
| 5,394,016 A | 2/1995 | Hickey | |
| 5,447,412 A | 9/1995 | Lamont | |
| 5,852,331 A | 12/1998 | Giorgini | |
| 6,147,415 A | 11/2000 | Fukada | |
| 6,210,792 B1 | 4/2001 | Seethamraju | |
| 6,582,291 B2 | 6/2003 | Clark | |
| 6,674,181 B2 | 1/2004 | Harbison | |
| 6,765,309 B2 | 7/2004 | Tallal, Jr. et al. | |
| 6,841,894 B2 | 1/2005 | Gomez Gomar | |
| 6,870,280 B2 | 3/2005 | Pechler | |
| 6,877,948 B2 | 4/2005 | Cutcher | |
| 6,911,744 B2 | 6/2005 | Roskey | |
| 6,984,899 B1 | 1/2006 | Rice | |
| D516,581 S | 3/2006 | Gomez Gomar | |
| 7,315,093 B2 | 1/2008 | Graham, Sr. | |
| 8,210,792 B2 | 7/2012 | Suma | |
| 2002/0006334 A1 | 1/2002 | Szpur | |
| 2003/0133782 A1* | 7/2003 | Holter | F03D 3/005 415/4.2 |
| 2004/0130161 A1 | 7/2004 | Gomez Gomar | |
| 2006/0275105 A1 | 12/2006 | Roberts et al. | |
| 2007/0217918 A1 | 9/2007 | Baker et al. | |
| 2007/0222225 A1 | 9/2007 | Mahoney | |
| 2007/0274830 A1 | 11/2007 | Flores Lumbreras | |
| 2009/0095339 A1 | 4/2009 | Nightingale | |
| 2013/0119661 A1* | 5/2013 | Pringle | F03D 9/25 290/44 |
| 2013/0334825 A1* | 12/2013 | Roter | F04D 29/522 290/55 |
| 2014/0183865 A1 | 7/2014 | Poutchkov | |
| 2015/0167636 A1* | 6/2015 | Al-Garni | F03D 9/007 307/72 |

FOREIGN PATENT DOCUMENTS

| | | |
|---|---|---|
| DE | 19956064 A1 | 5/2001 |
| EP | 0867615 A1 | 9/1998 |
| EP | 1985847 A1 | 10/2008 |
| EP | 2825769 | 9/2013 |
| GB | 2269859 A | 2/1994 |
| GB | 2500199 A | 9/2013 |
| JP | 2003035252 A | 2/2003 |
| JP | 2007303459 A | 11/2007 |
| WO | 9904163 A1 | 1/1999 |
| WO | 2013136060 A1 | 9/2013 |

OTHER PUBLICATIONS

Labarre, Suzanne, "Harvesting the Wind," Metropolis Magazine, May 2009.
International Search Report and Written Opinion dated Jan. 20, 2011, for corresponding International Application No. PCT/US2010/ 038164; International Filing Date: Jun. 10, 2010 consisting of 7-pages.
EP Communication Pursuant to Article 94(3) EPC dated Feb. 16, 2022, for corresponding European Application No. 17734505.5; consisting of 6-pages.

* cited by examiner

ELECTRIC POWER SYSTEM FOR CONVERTING WIND ENERGY INTO ELECTRIC ENERGY AND BUILDING WITH SYSTEM

CROSS-REFERENCE TO RELATED APPLICATIONS

This application is a Submission under 35 U.S.C. § 371 for U.S. National Stage Patent Application of International Application Number PCT/NL2017/050359, filed Jun. 1, 2017, entitled ELECTRIC POWER SYSTEM FOR CONVERTING WIND ENERGY INTO ELECTRIC ENERGY AND BUILDING WITH SYSTEM, which claims priority to Netherlands Application No. 2016888, filed Jun. 2, 2016, the entirety of both of which is incorporated herein by reference.

The present invention relates to an electric power system for converting wind energy into electric energy, and to a building, provided with such system. Systems for converting wind energy into electric energy are known as such, and generally comprise a wind-driven turbine, arranged on a mast, and comprising one or more blades, rotatable around a horizontal axis of rotation.

A disadvantage is that relatively a lot of space is required, which is not always available in for instance an urban environment. Moreover, a turbine with blades rotating about a horizontal axis is optimized for one wind direction only. Finally, they are in many cases not welcomed for esthetic reasons.

As an alternative, vertically oriented turbines exist, and are in general easier to integrate in an urban environment. Additionally, in general, the vertically oriented turbines are less sensitive to wind directions, and may be considered less offensive in an esthetical point of view. However, they are less efficient than the horizontal ones.

The US patent application 2013/334825 describes a number of configurations wherein vertical wind turbines are arranged in a tunnel, which tunnel subsequently catches the wind, concentrates it and drains it. The US patent application 2015/167636 and the Canadian application CA 2633876 show similar configurations with longer tunnels, having an expanding end section.

These are all examples of configurations according to the preamble of claim 1, and of prior art FIG. 1. In the examples, wind turbines are placed in a tunnel or duct in order to increase efficiency of turbine and energy output. This duct may comprise a front part with a decreasing area towards the turbine and may further have a part behind the turbine, seen in the overall direction of the air flow.

However, there are still improvements to be made, in particular in the efficiency of the conversion of the wind energy to electric energy. It is therefore a goal of the present invention to propose an electric power system for converting wind energy into electric power, lacking the disadvantages of the prior art, or at least to provide a useful and/or attractive alternative to the prior art.

The invention thereto proposes an electric power system for converting wind energy into electric energy, comprising a duct for air, the duct comprising a floor, a first and a second wall, a roof, and the duct further defining an air inflow direction towards a turbine, the turbine having a diameter, and being located adjacent to or at least partially in the duct; and defining together with the duct an air outflow direction, as proposed by the prior art, but characterised in that an area free of pressure or turbulence increasing obstructing elements, extending in the resultant air outflow direction of the turbine over a length of at least one, and preferably more than two times the turbine diameter, measured from the centre of rotation of the turbine.

Although the configurations in the prior art patents mentioned above may work fine according to the descriptions in these patents, it is noticed by the present applicant that these are based on a theoretical expectation of a zero-backflow and no rotating turbine, which is purely a lab venture experiment.

According to the present invention it was found that for instance an expanding tunnel behind the turbine creates an increased pressure area with turbulent flow behind the turbine due to the work of the turbine itself and backflow of wind coming from outside the system into the back end of the funnel filling up the lower pressure area, and making the backend suction stop. This dramatically decreases the efficiency of the total flow. Prior art FIG. 1 shows the pressure increases caused by a number of elements known from the prior art.

According to the present invention, it was found that a higher yield and efficiency are obtained when there is either an empty space behind the turbine with no (expanding) funnel, because such funnel introduces backflow and local pressure increase, and that further improvements may be obtained when at least one element which spreads out the outflow is present.

It is therefore suggested by the present invention to have an area behind the turbine with at least one and preferable more than two times the turbine diameter free of these elements. In particular that is, an area free of an expanding duct or tunnel or funnel. This is in particular in the direction of the outflow.

The floor and the roof may in a practical embodiment for instance be oriented essentially perpendicular to the walls, so that a tube with an essentially square cross section is obtained, but multiple shapes and configurations are thinkable. The turbine may be any type of turbine, both with blades extending parallel to its axis of rotation, which may be vertical or horizontal. In such cases, the axis of rotation is also the center of rotation. The turbine may also have blades extending from its axis of rotation, which in that case will be horizontal. In this (propeller type) case the origin at the axis of rotation from where the blades extend will be the center of rotation.

The duct may have a throughput area that decreases downstream, for converging and thus focussing the air flow, causing a higher speed inside the duct, which is beneficial for the power transfer to the turbine. However, after the turbine, for an optimal air flow, that is an air outflow that as a whole encounters the least resistance, it is important that, no more pressure increase takes place. For that reason, at least one inventive aspect of the present invention is to provide an area free of pressure increasing obstructing elements, extending in the air outflow direction of the turbine over a length of at least one, and preferably more than two times the turbine diameter, and mostly preferred over a length of about three times the turbine diameter measured from the centre of rotation of the turbine. It has been determined by the applicant, that an area free of pressure increasing obstructing elements extending more than three times the turbine diameter does not improve the performance anymore.

Pressure increasing obstructing elements are to be understood as elements that cause at least a locally increased pressure, for instance because they impede a free air flow, or because they form a course of turbulence. A first example of pressure increasing elements is given in FIG. 1 (prior art), wherein an expanding tunnel or funnel is shown. As indicated in the figure, this causes turbulence at at least one of the walls of the tunnel. Which wall this is actually depends on the rotational direction of the turbine.

A second example is given in US patent application 2013 334825, wherein an expanding funnel is present at the outlet side of the duct.

A third example is given in US patent application US 2015/167636, wherein a relatively long funnel is present. This funnel has a constant diameter, but due to the fact that the direction of the air flow behind the turbine is not parallel to the axis of the duct, such funnel acts as a pressure increasing element.

In many state of the art solutions, in particular those with turbines with vertical axis of rotation, walls are present around the turbine. Although they are generally considered as beneficial for creating a duct for every direction of incoming wind, when optimising for just one direction, according to the present invention they are found to have disadvantages.

In a further embodiment, the system according to the invention comprises a pressure decreasing element, such as a diffuser, arranged in the area free of pressure increasing obstructing elements. Such diffuser generally consists of sharp edged rounded blades (for instance having an almond or canoe shaped cross section), diverging an air flow without obstructing it. The beneficial effect of such diffuser is that it causes a (local) pressure decrease, which contributes to the desired optimal air flow.

In practice, the floor and the roof are oriented essentially horizontal in use, and the walls are oriented essentially vertical in use. A housing may be formed, being adapted for placement on the roof of a building. Said housing, and in particular the floor and the roof may be essentially rectangular, and in a particular embodiment square. In a preferred embodiment, the floor has a rectangular shape, with measurements of about 6×3 meters, wherein the axis of rotation of the turbine is oriented in the middle of one of the long sides.

The walls may be straight panels, put it is also thinkable that at least one of the walls is curved or folded, in order to reduce turbulence.

The combination of the floor, roof and walls forming the duct and the placement of the turbine with respect to the duct lead to a concentration of wind toward the turbine and as a result to an increased wind velocity through a venturi effect and increased power generation.

In a further embodiment, the walls extend under a respective first angle and second angle with respect to a line connecting their starting points, wherein the first angle lies between 45 and 90 degrees, and wherein the second angle lies between 25 and 65 degrees. This way the system according to the invention can be optimized for different dominant wind directions before it is actually mounted at site.

A duct can be thus formed that leads the wind towards one side of the turbine, while the other is—at least for wind coming from the same direction—covered by one of the walls. In a turbine with a vertical axis, it is important to concentrate the wind to one site in which the blades of the turbine are oriented such that they catch the maximum amount of wind, while in the other orientation, when they should move against the wind, they are covered as much as possible.

It has appeared, that optimal results are obtained when the first angle and the second angle are together 90 degrees.

In a further embodiment, the side of the floor facing the roof is inclined, going upward from its edge inwardly, over a distance smaller than the distance from the edge to the turbine.

An advantage of this feature is that it reduces turbulence at the roof edge so that the air flow is more steady at the turbine, because a smoother entrance to the system is created, decreasing turbulence and leading to a more stable operation of the system, in particular when the system according to the invention is applied on the roof of a (high) building, whereby part of the wind or air is deflected by the building facade and thus obtains a directional component upwardly.

The turbulence reducing effect can be further increased when also the side of the roof facing the floor is inclined, going downward from its edge inwardly, over a distance smaller than the distance from the edge to the turbine. In particular, the angle under which the roof is inclined toward the floor may be between 15 and 20 degrees.

The system according to the invention may further comprise at least one louver, extending between the first and the second wall, and inclined upwardly in a direction toward the turbine. The louver may for example be under an angle between 5 and 30 degrees with the horizontal.

Such louver also contributes to a more homogeneous direction of the incoming air directing on turbine. In a practical embodiment, the system according to the invention comprises two louvers, wherein a first louver, arranged above the floor, is inclined at an angle between 20 and 30 degrees, and a second louver, arranged between the fist louver and the roof, is inclined at an angle between 5 and 15 degrees.

In a further aspect of the present invention, the roof extends over the floor in a direction away from the turbine.

This has the advantage of capturing air with an upward component, but also enlarges the roof surface, which may be beneficial for further purposes, for instance for placing solar panels on top of the roof of the system. The duct may in that case be configured for guiding air along the bottom side of the solar panels, for cooling the latter.

The direction from the edge of the floor to the edge of the roof may extend at an angle between 5 and 20, and in particular between 8 and 12 degrees from a direction perpendicular to the plane in which the roof or the floor lays. It has appeared that with these angles, optimum points of catching mass flow from façade are obtained.

Another aspect of the present invention is that the cross section of the duct decreases in a direction toward the turbine. Herewith, locally a higher air speed is obtained, which leads to a higher rotational speed of the turbine for a given wind force, and thus to a higher power generation. Preferably the cross section decreases between 1 and 3 times.

A further aspect of the invention comprises a deflector, arranged between the first wall and the second wall. The deflector may be movable. Herewith, instead of placing the walls in different angles, similar effect can be reached by placing a deflector before the turbine. The blade is, coming towards the edge of the building protected from the wind.

The invention also relates to a building, provided with a system according to any of the preceding claims, in particular wherein the system is placed at the edge of the building roof.

Figure 1B:
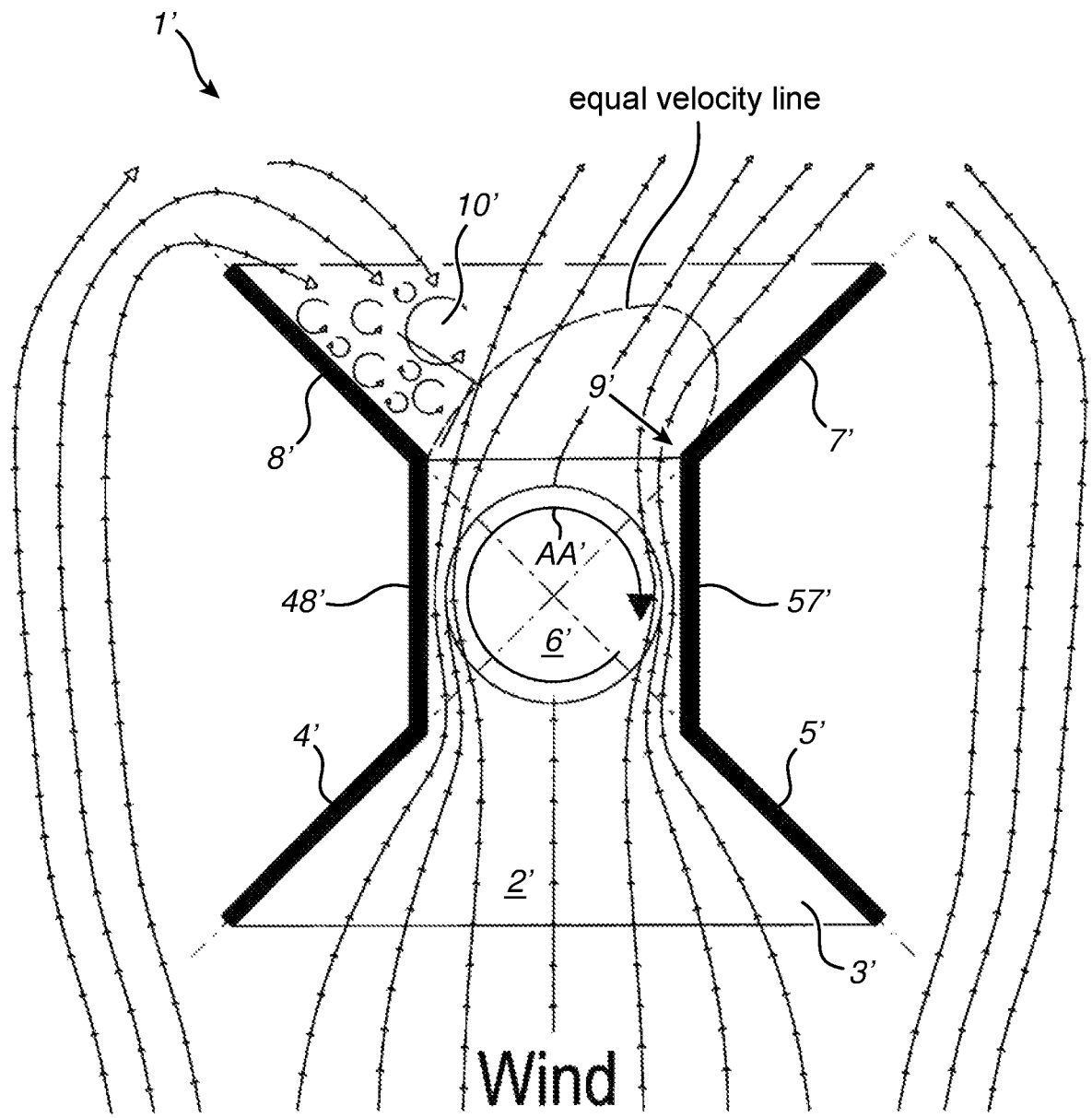
Figure 1C:
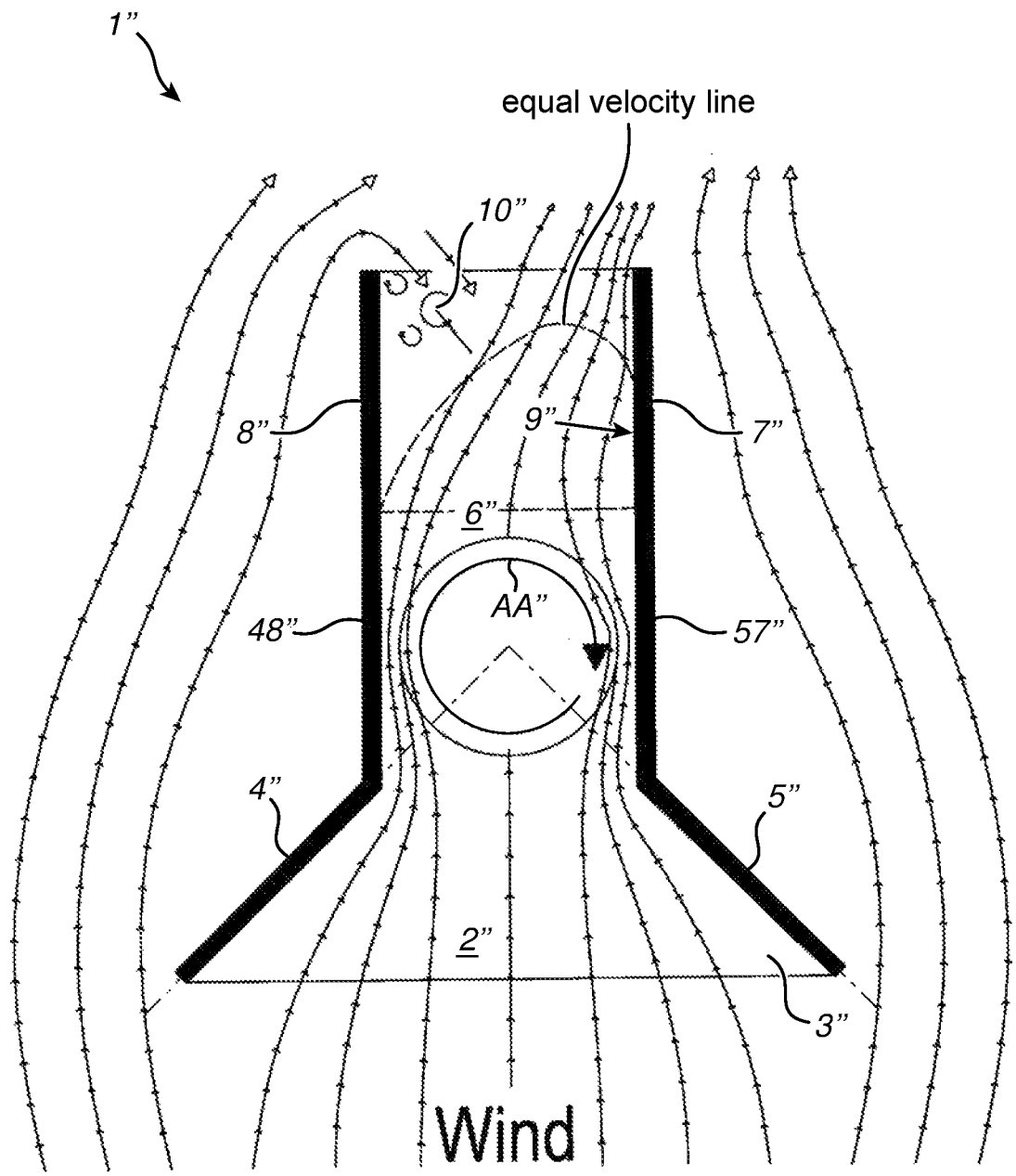
Figure 2A:
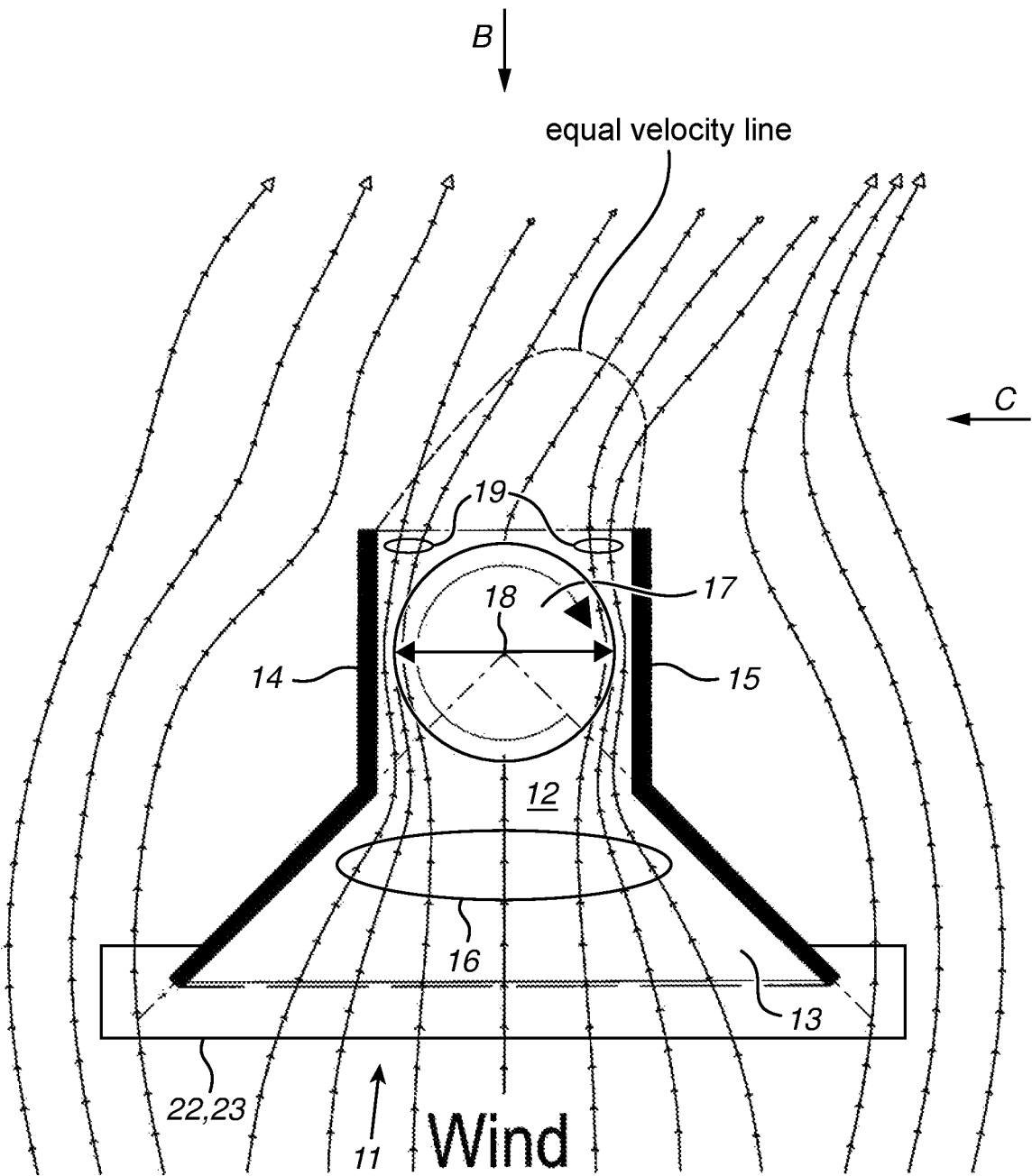
Figure 2B:
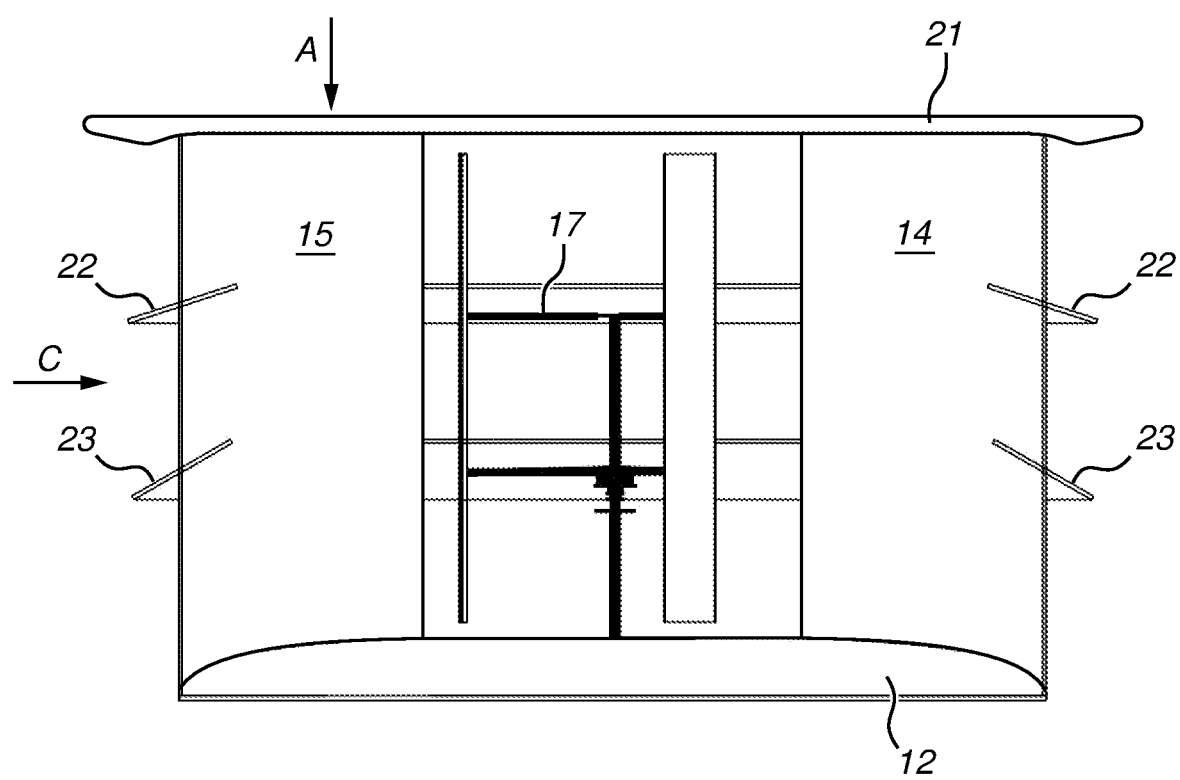
Figure 2C:
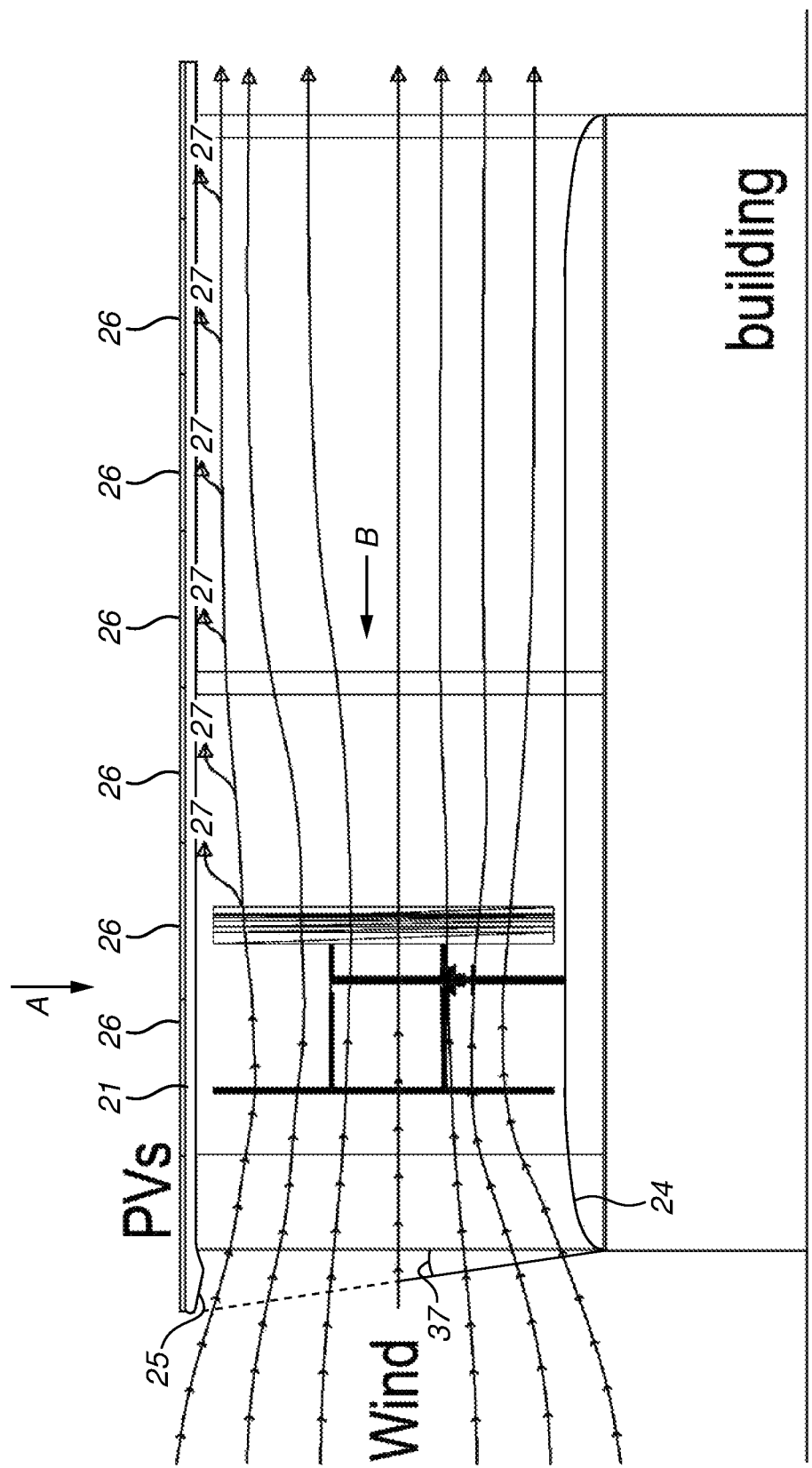
Figure 5A:
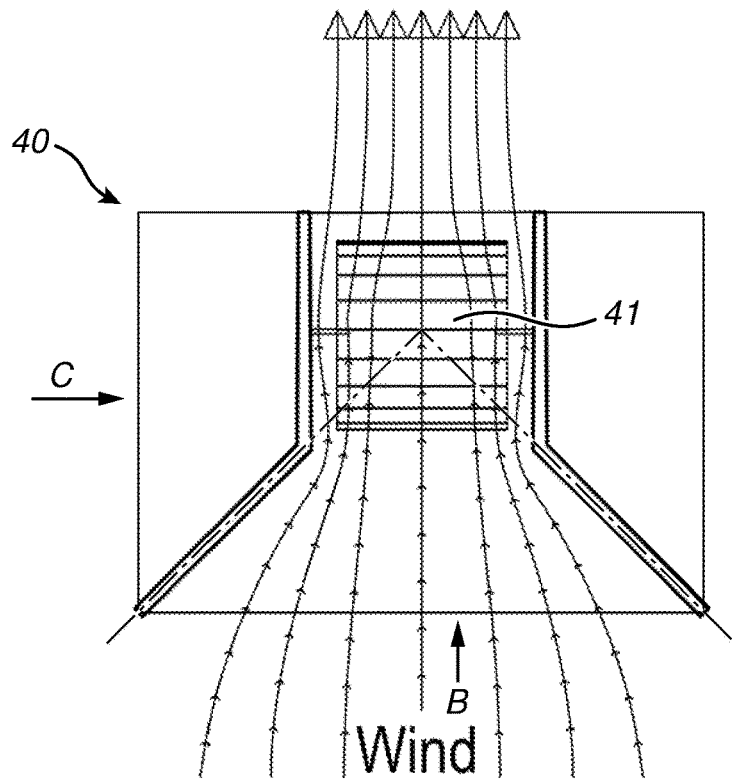
Figure 5B:
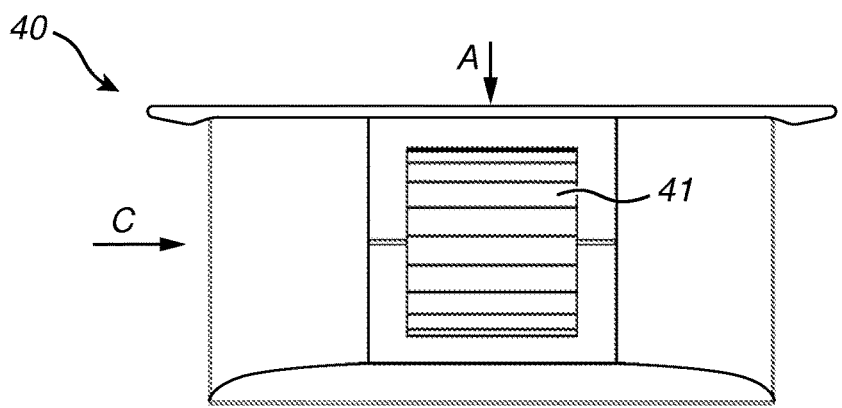
Figure 5C:
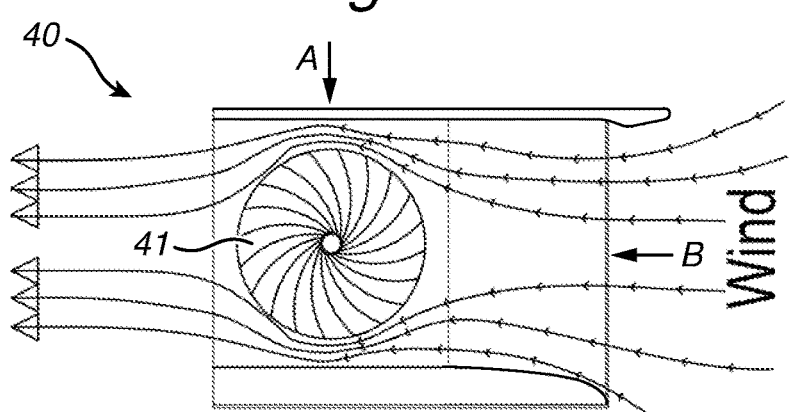
Figure 6A:
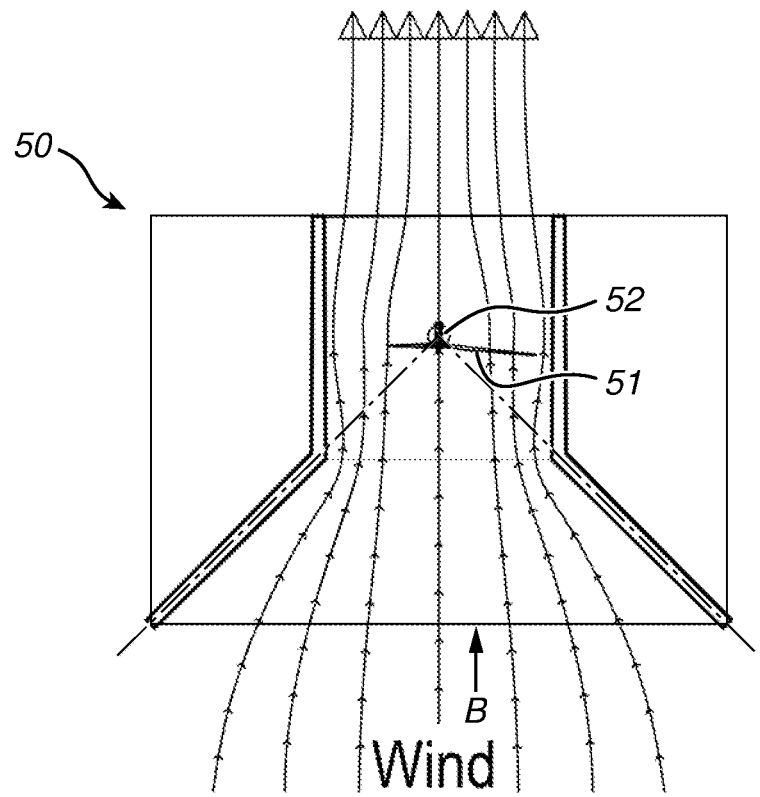
Figure 7:
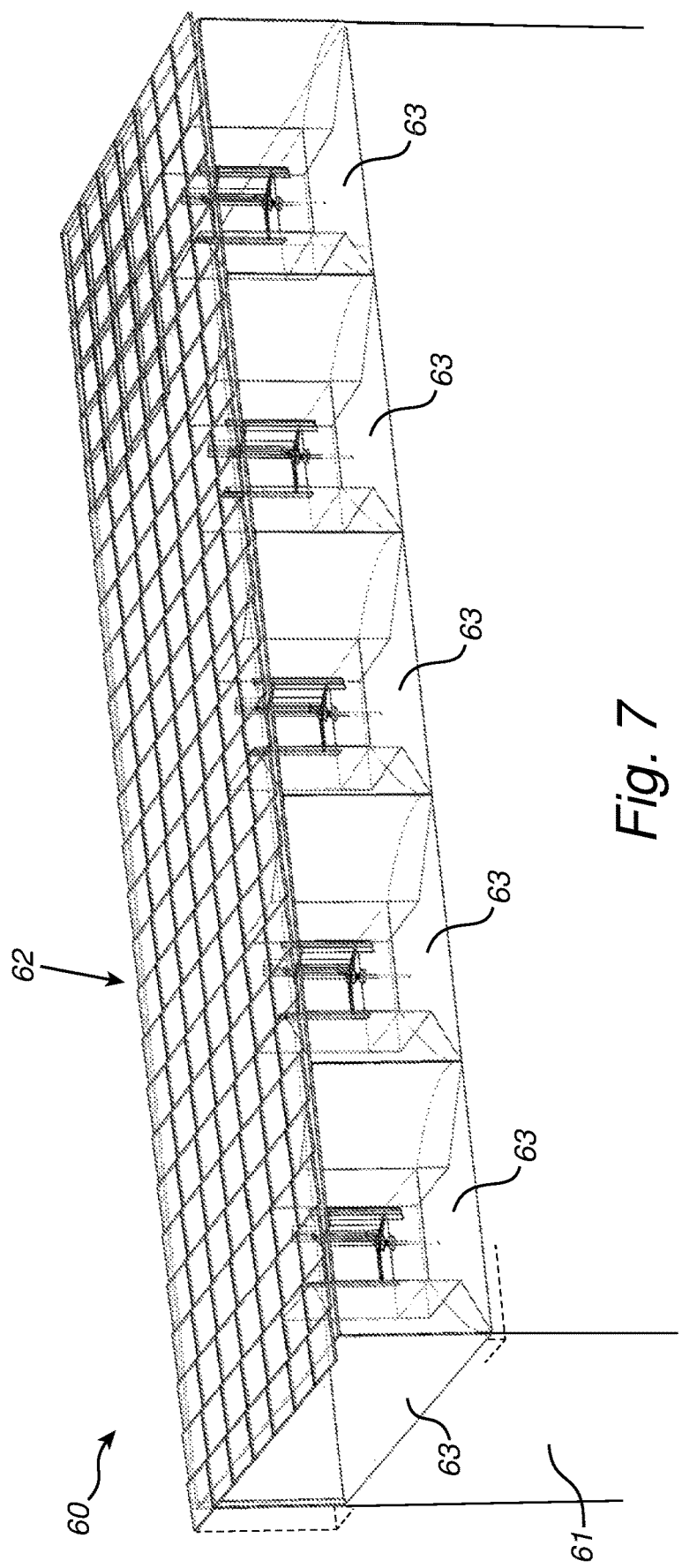

The invention will now be elucidated into more detail with respect to the following figures, wherein:

FIGS. 1a-c show a schematic top views of systems according to the state of the art;

FIG. 2a-c show different views a first embodiment of the present invention;

FIGS. 3a-b show a schematic top view of two versions of a second embodiment of the present invention;

FIG. 4 shows a schematic top view of a third embodiment of the present invention;

FIG. 5a-b-c show different views of a fourth embodiment side view of a system of the present invention;

FIG. 6a, b show a different views of a fifth embodiment of the invention;

FIG. 7 shows a perspective view of a building according to the present invention.

FIG. 1a shows a first schematic top view of an electric power system 1 according to the preamble (prior art) of claim 1. The system 1 comprises a duct 2 for air, the duct 2 comprising a floor 3, a first and a second wall 4, 5 and a roof (left away in this view), and defines an air inflow direction towards a turbine 6 located adjacent to the duct and defining together with the duct an air outflow direction. Due to the wind, depicted with lines with repeated arrows, the turbine gets to rotate in the direction of arrow AA. In the outflow direction, a third and fourth wall 7, 8 are present. As visible in the figure, around the third and fourth wall both a high pressure area 9 and turbulence 10 are present, which is undesired.

FIG. 1b shows a second schematic top view of an electric power system 1 according to the preamble (prior art) of claim 1. This schematic view corresponds to the prior art disclosed in US patent application 2013/334825. The system 1' comprises a duct 2' for air, the duct 2' comprising a floor 3', a first and a second wall 4', 5' and a roof (left away in this view), and defines an air inflow direction towards a turbine 6 located adjacent to the duct and defining together with the duct an air outflow direction. In the outflow direction, a third and fourth wall 7', 8' are present. The difference with the prior art shown in FIG. 1a is that wall 4' and 8' and wall 5' and wall 7 are connected by sections 48' and 57' respectively. As visible in the figure, around the third and fourth wall 7' and 8' again both a high pressure area 9 and turbulence 10 are present, which is undesired. Arrow AA' again indicates the direction of movement of the turbine.

FIG. 1c shows a second schematic top view of an electric power system 1 according to the preamble (prior art) of claim 1. This schematic view corresponds to the prior art disclosed in US patent application 2015/167636 and the Canadian application CA 2633876. The system 1" comprises a duct 2" for air, the duct 2" comprising a floor 3", a first and a second wall 4", 5" and a roof (left away in this view), and defines an air inflow direction towards a turbine 6" located adjacent to the duct and defining together with the duct an air outflow direction. In the outflow direction, a third and fourth wall 7", 8" are present. The difference with the prior art shown in FIG. 1b is that wall 7" and 8" extend in the directions of wall sections 48" and 57" respectively. One might as well consider this configuration as having one relatively long funnel serving as a duct. As visible in the figure, also here, around the third and fourth wall 7' and 8' again both a high pressure area 9" and turbulence 10" are present, which is undesired. Arrow AA" again indicates the direction of movement of the turbine. A general conclusion of the prior art as described above is that the walls 7, 7' and 7" as well as the walls 8, 8' and 8" form pressure increasing elements and are as such undesired according to the present invention and falling outside the scope of the claims of this application.

FIG. 2a shows a schematic top view of a first embodiment of the present invention. The figure shows an electric power system 11 for converting wind energy into electric energy, comprising a duct 12 for air, the duct 12 comprising a floor 13, a first and a second wall 14, 15, a roof (left away in this view), the duct defining an air inflow direction 16 towards a turbine 17 having a diameter 18, and being located in the duct 12; and defining together with the duct an air outflow direction 19, wherein an area free of pressure and/or turbulence increasing obstructing elements extends in the (average) air outflow direction of the turbine 17. The turbine 17 is of the vertical axis type. In this figure limitations of the area are not visible. A high pressure area 20 is still present, but compared to the state of the art, the turbulence areas have disappeared.

FIG. 2b shows the system 11 from FIG. 2a seen from the direction B indicated in FIG. 2a. A indicates the view direction in which FIG. 2a would be seen and like reference numbers indicate like parts here. Additionally, in this view, a roof 21 is shown here. Furthermore, two louvers 22, 23 are shown, wherein a first louver 23, arranged above the floor, is inclined upwards at an angle between 20 and 30 degrees, and a second louver 22, arranged between the fist louver 23 and the roof 21, is inclined at an angle between 5 and 15 degrees.

FIG. 2c shows a side view seen from the direction C in figures A and B. In this figure it is visible that the side 24 of the floor facing the roof is inclined, going upward from its edge inwardly, over a distance smaller than the distance from the edge to the turbine. Furthermore, it is visible that the side 25 of the roof facing the floor is inclined, going downward from its edge inwardly, over a distance smaller than the distance from the edge to the turbine. The angle under which the roof is inclined toward the floor is between 15 and 20 degrees. Also visible is that there are solar panels 26 on top of the roof, wherein the duct is configured for guiding air along the bottom side 27 of the solar panels, for cooling the latter.

Finally, it is visible in FIG. 2c that wherein the roof extends over the floor in a direction away from the turbine. The direction from the edge of the floor to the edge of the roof extends at an angle 37 between 5 and 20, and in particular between 8 and 12 degrees from a direction perpendicular to the plane in which the roof or the floor lays.

Figure 3:
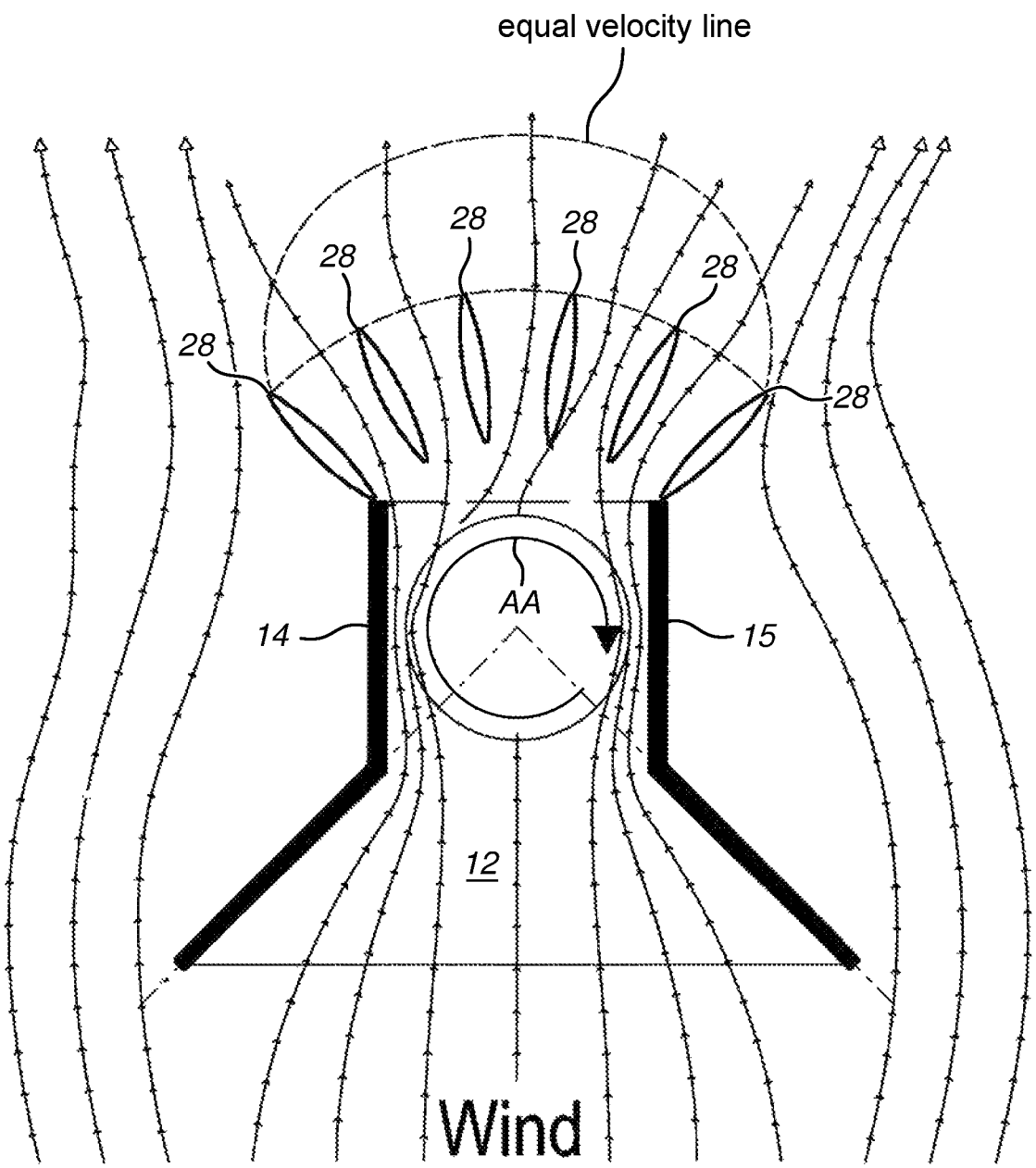

FIG. 3 shows a schematic top view of a second embodiment of the present invention, which is similar to the one from FIGS. 2, with the addition of a pressure decreasing element formed by a diffuser 28, arranged in the area free of pressure increasing obstructing elements. As indicated in the figure, the diffuser 28 has the effect of a low pressure area 29 which is beneficial.

Figure 4A:
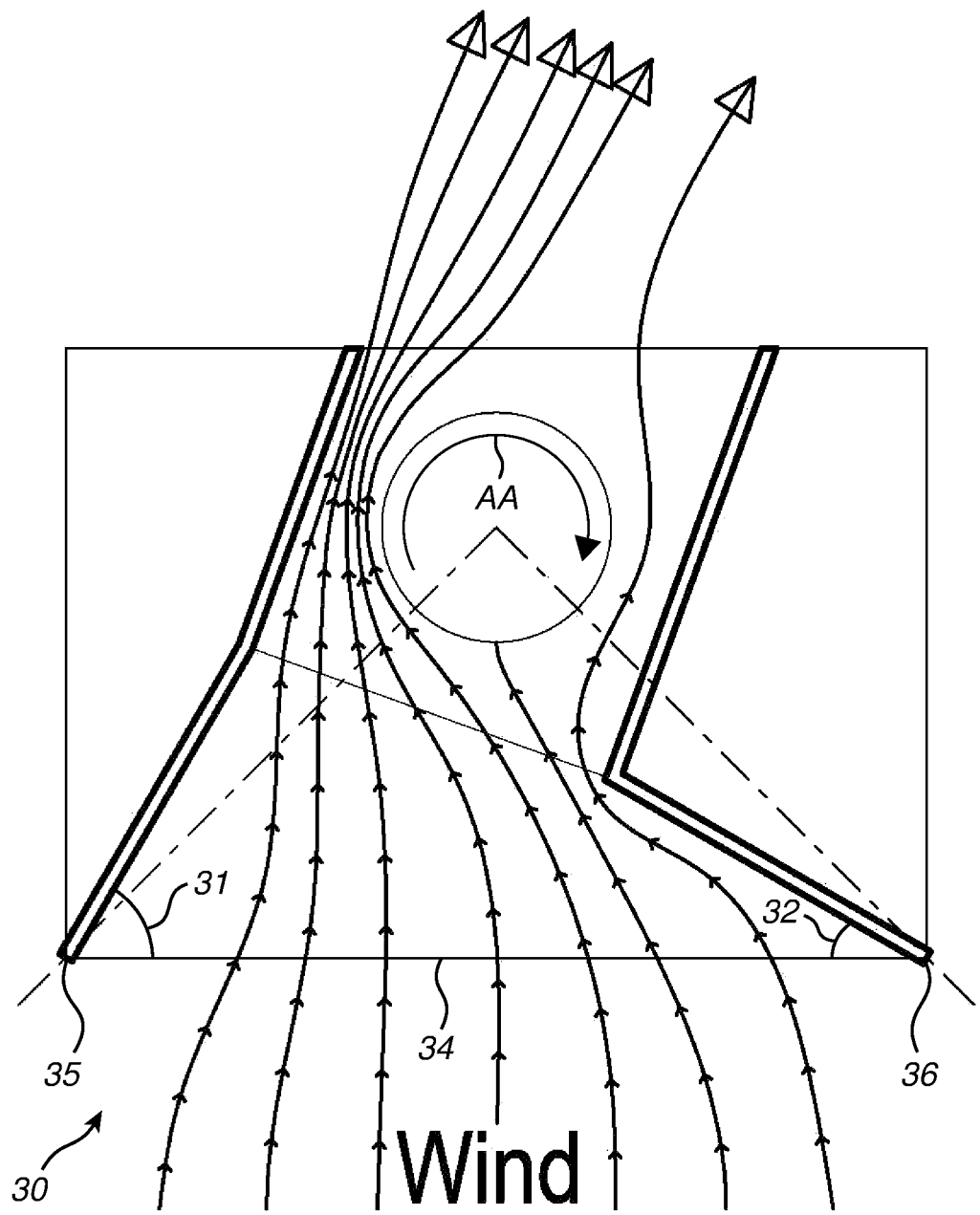

FIG. 4a shows a schematic top view of a first version of a third embodiment 30 of the present invention wherein it is visible that the walls extend under a respective first angle 31 and second angle 32 with respect to a line 34 connecting their starting points 35, 36, wherein the first angle lies between 45 and 90 degrees, and wherein the second angle lies between 25 and 65 degrees. Like in the other embodiments shown, the first angle and the second angle together are 90 degrees, which is a preference according to the present invention.

Figure 4B:
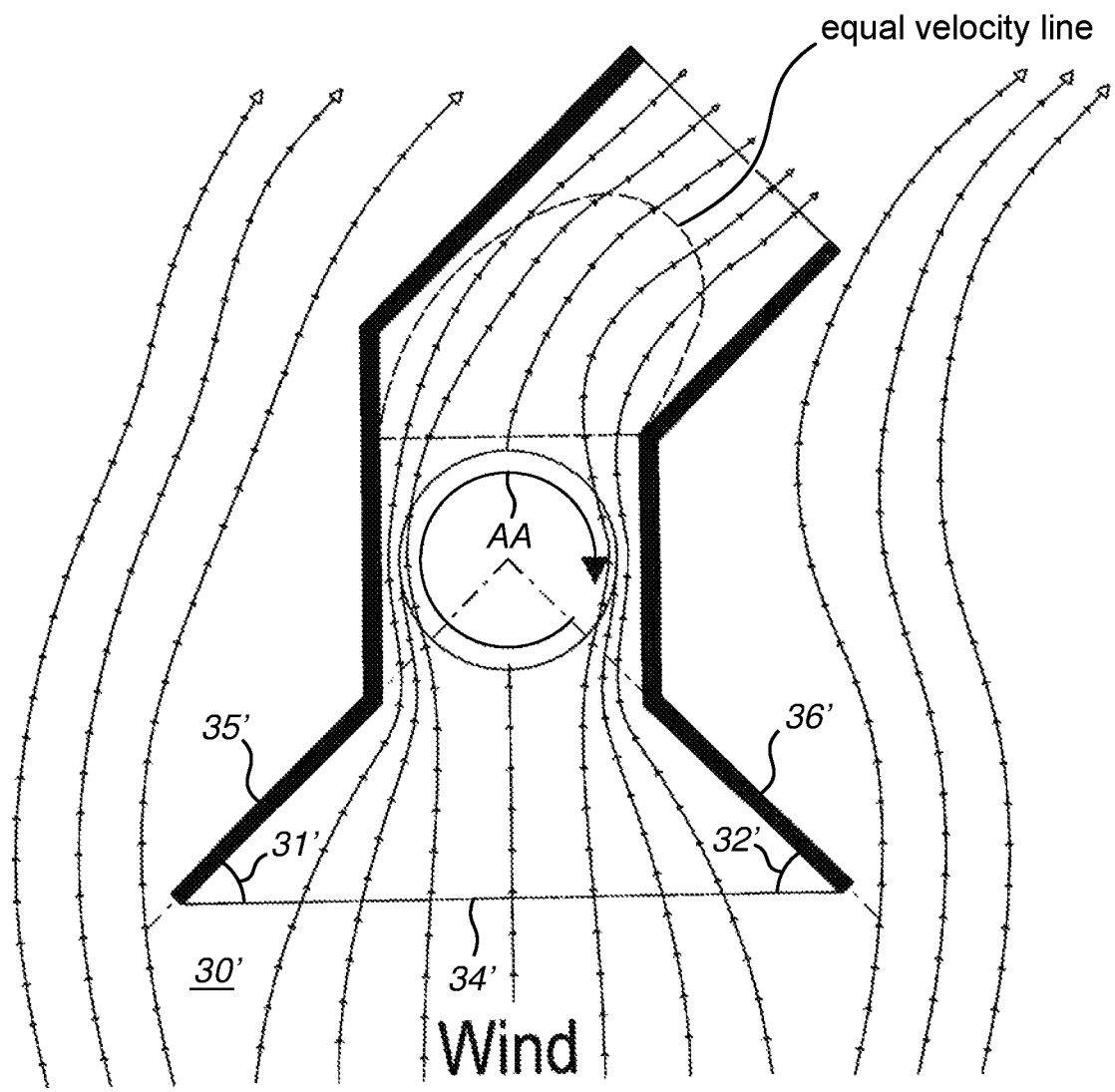

FIG. 4b shows a schematic top view of a second version of a third embodiment 30' of the present invention wherein it is visible that the walls extend under a respective first angle 31' and second angle 32' with respect to a line 34' connecting their starting points 35', 36', wherein the first angle lies between 45 and 90 degrees, and wherein the second angle lies between 25 and 65 degrees. Like in the other embodiments shown, the first angle and the second angle together are 90 degrees, which is a preference according to the present invention.

In both FIGS. 4a and 4b, the air flowing out of the duct is not hindered by walls of the duct itself, due to their directions, corresponding with the direction in which the air is directed to by the turbine.

FIG. 5a-b-c show different views of a fourth embodiment 40 side view of a system of the present invention, wherein the turbine 41 is a windmill type, having blades extending parallel to the axis of rotation.

Figure 6B:
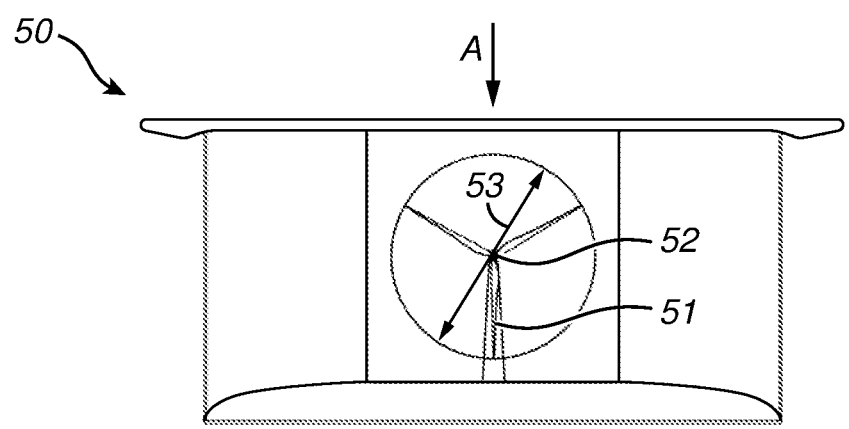

FIGS. 6a, 6b show different views of a fifth embodiment 50 of the present invention, wherein a propeller type turbine 51 is applied, having a center of rotation 52 and a diameter 53.

FIG. 7 shows a perspective view of a building according to the present invention, showing that the roof of the system according to the invention extends over a larger area than the actual roof of the building the system is located on. Multiple systems according to the present invention are arranged on the same building. This way, the building is optimally used from an energy generation point of view. A free height for existing piping and vents is left (not visible). In addition, a walk area to do maintenance to the building roof and the system may be kept. Power electronics may be are integrated in the walls of the system and the system may be liftable upwards to give space for a window washing system. These and all other features mentioned in this description are exemplary only and in no way limiting the scope of this patent as defined in the following claims. In particular all features can be combined with or without each other.

The invention claimed is:

1. An electric power system for converting wind energy into electric energy, comprising:
   a duct configured for air flow, the duct including:
      a floor, the floor having a side;
      a roof opposed the floor, the roof having a side facing the side of the floor;
      a first wall, and a second wall opposed the first wall;
      the first wall and the second wall connected to the roof and the floor defining an air flow opening;
      the floor having an edge proximate the air flow opening;
      the roof having an edge proximate the air flow opening;
      the roof and the floor being asymmetrical proximate the air flow opening, the roof having a first length and the floor having a second length, the first length being greater than the second length; and
      the roof and the floor being substantially parallel; and turbine;
   wherein the roof further comprises a first portion and a second portion, the roof having a first width, the first portion and the second portion each having a second width, the second with being wider than the first width, and the first portion extending beyond the first wall and the second portion extending beyond the second wall.

2. The electric power system of claim 1, further comprising a pressure decreasing element arranged in the area free of pressure increasing obstructing elements.

3. The electric power system of claim 1, wherein the walls extend under a respective first angle and a second angle with respect to a line connecting the starting points of the first angle and the second angle, where the first angle lies between 45 and 90 degrees, and where the second angle lies between 25 and 65 degrees.

4. The electric power system of claim 1, wherein the side of the floor facing the roof is inclined, going upward from the edge of the floor inwardly, over a distance smaller than the distance from the edge to the turbine.

5. The electric power system of claim 1, wherein the side of the roof facing the floor is inclined, going downward from the edge of the roof inwardly, over a distance smaller than the distance from the edge to the turbine.

6. The electric power system of claim 5, wherein the angle under which the roof is inclined toward the floor is between 15 and 20 degrees.

7. The electric power system of claim 1, further comprising at least one louver, extending between the first and the second wall, and inclined upwardly in a direction toward the turbine.

8. The electric power system of claim 7, wherein the at least one louver is a first louver and a second louver, the first louver, arranged above the floor, is inclined upwards at an angle between 20 and 30 degrees, and the second louver, arranged between the first louver and the roof, is inclined at an angle between 5 and 15 degrees.

9. The electric power system of claim 1, wherein the roof extends over the floor away from the turbine.

10. The electric power system of claim 9, wherein the floor further includes a side and an edge and the roof includes a side and an edge, the direction from the edge of the floor to the edge of the roof extends at an angle between 5 and 20 degrees, and between 8 and 12 degrees from a direction perpendicular to the plane in which the roof or the floor lays.

11. The electric power system of claim 1, wherein the cross section of the duct decreases in a direction toward the turbine.

12. The electric power system of claim 11, wherein the cross-section decreases between 1 and 3 times.

13. The electric power system of claim 1, further comprising solar panels on top of the roof.

14. The electric power system of claim 13, wherein the duct is configured for guiding air along the bottom side of the solar panels, for cooling the bottom side of the solar panels.

15. The electric power system of claim 1, further comprising a deflector before the turbine inside or adjacent to the air duct.

16. The electric power system of claim 15, wherein the deflector is movable.

17. The electric power system of claim 1, wherein an air inflow direction is defined through the air flow opening towards the at least one turbine; and
   the at least one turbine having a diameter, being disposed adjacent to or at least partially in the duct, and defining together with the duct an air outflow direction with an area free of at least one from the group consisting of pressure and turbulence increasing obstructing elements, extending in the resultant air outflow direction of the turbine over a length of at least one, and preferably more than two times the turbine diameter, measured from the center of rotation of the turbine.

18. A duct configured for air flow, comprising:
   a roof;
   a floor opposite and facing the roof and substantially parallel therewith;
   a first side wall and a second side wall facing the first side wall;
   the first side wall and second side wall connecting the roof and the floor to define an airflow opening therethrough;
   the roof and the floor having an edge proximate the airflow opening; and the roof and the floor being asymmetrical proximate the air flow opening, the roof having a first length and the floor having a second length, the first length being greater than the second length;

wherein the roof further comprises a first portion and a second portion, the roof having a first width, the first portion and the second portion each having a second width, the second with being wider than the first width, and the first portion extending beyond the first wall and the second portion extending beyond the second wall.

19. An electric power system for converting wind energy into electric energy, comprising:
   a duct configured for air flow, including:
      a roof;
      a floor opposite and facing the roof and substantially parallel therewith;
   a first side wall and a second side wall facing the first side wall;
   the first side wall and second side wall connecting the roof and the floor to define an airflow opening therethrough;
   the roof and the floor having an edge proximate the airflow opening; and
   the roof and the floor being asymmetrical proximate the air flow opening, the roof having a first length and the floor having a second length, the first length being greater than the second length; and
   a turbine;
   a pressure decreasing element arranged in an area free of pressure increasing obstructing elements;
   a deflector before the turbine inside or adjacent to the air duct; at least one louver, extending between the first and the second wall, and inclined upwardly in a direction toward the turbine; and
   solar panels on top of the roof;
   wherein the roof further comprises a first portion and a second portion, the roof having a first width, the first portion and the second portion each having a second width, the second with being wider than the first width, and the first portion extending beyond the first wall and the second portion extending beyond the second wall.

* * * * *